United States Patent
Santhanam et al.

(10) Patent No.: US 10,687,196 B2
(45) Date of Patent: Jun. 16, 2020

(54) FREQUENCY DETERMINATION FOR DEVICE-TO-DEVICE TRANSMISSIONS AND RECEPTIONS

(71) Applicant: QUALCOMM Incorporated, San Diego, CA (US)

(72) Inventors: Arvind Santhanam, San Diego, CA (US); Scott Hoover, Del Mar, CA (US); Srinivasan Balasubramanian, San Diego, CA (US); Daniel Amerga, San Diego, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 15/262,857

(22) Filed: Sep. 12, 2016

(65) Prior Publication Data
US 2017/0078865 A1 Mar. 16, 2017

Related U.S. Application Data

(60) Provisional application No. 62/219,043, filed on Sep. 15, 2015.

(51) Int. Cl.
*H04W 8/00* (2009.01)
*H04W 72/02* (2009.01)
(Continued)

(52) U.S. Cl.
CPC ............ *H04W 8/005* (2013.01); *H04L 5/001* (2013.01); *H04L 5/003* (2013.01); *H04L 5/0053* (2013.01);
(Continued)

(58) Field of Classification Search
CPC ...... H04W 8/005; H04W 72/02; H04W 48/12; H04W 76/023; H04L 5/0007; H04L 5/001; H04L 5/003; H04L 5/0005; H04L 5/0051
See application file for complete search history.

(56) References Cited

U.S. PATENT DOCUMENTS 8,509,105 B2 8/2013 Kneckt et al.
2007/0260851 A1 11/2007 Taha et al.
(Continued)

FOREIGN PATENT DOCUMENTS

WO 2015065085 A1 5/2015

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)", 3GPP Draft; Draft 36304-C60, 3rd Generation Partnership Project (3GPP), Mobile Competence Centre ; 650, Route Des Lucioles ; F-06921 Sophia Antipolis Cedex ; France Sep. 14, 2015 (Sep. 14, 2015), XP051023066, Retrieved from the Internet: URL:http://www.3gpp.org/ftp/tsg_ran/WG2_RL2/Specifications/201509_draft_specs_after-RAN_69/.
(Continued)

*Primary Examiner* — Jianye Wu
(74) *Attorney, Agent, or Firm* — Arent Fox LLP

(57) ABSTRACT

A method, an apparatus, and a computer-readable medium for wireless communication are provided. The apparatus selects a serving cell for connection to a network. The apparatus performs a search for a frequency band on a neighbor cell for use in device-to-device communications. The apparatus performs the device-to-device communications using pre-configured resources associated with the frequency band when the search for the frequency band on
(Continued)

the neighbor cell fails. The apparatus performs the device-to-device communications using resources associated with the frequency band of the neighbor cell when the search for the frequency band on the neighbor cell is successful.

24 Claims, 14 Drawing Sheets

(51) Int. Cl.
  *H04L 5/00* (2006.01)
  *H04W 48/12* (2009.01)
  *H04W 76/14* (2018.01)
(52) U.S. Cl.
  CPC ............ *H04W 72/02* (2013.01); *H04L 5/005* (2013.01); *H04L 5/0007* (2013.01); *H04L 5/0051* (2013.01); *H04W 48/12* (2013.01); *H04W 76/14* (2018.02)

(56) References Cited

U.S. PATENT DOCUMENTS

| | | | |
|---|---|---|---|
| 2012/0034917 | A1 | 2/2012 | Kazmi |
| 2014/0274192 | A1 | 9/2014 | Zhu et al. |
| 2015/0063095 | A1 | 3/2015 | Deng et al. |
| 2015/0208421 | A1 | 7/2015 | Agiwal et al. |
| 2016/0029429 | A1* | 1/2016 | Peng ............... H04W 36/00 370/329 |
| 2016/0150504 | A1 | 5/2016 | Chae et al. |
| 2016/0165559 | A1 | 6/2016 | Nagata et al. |
| 2017/0086213 | A1* | 3/2017 | Kalhan ............ H04W 36/00 |
| 2017/0195905 | A1* | 7/2017 | Jung ................ H04W 24/08 |

OTHER PUBLICATIONS

3GPP TS 36.331: "3rd Generation Partnership Project; Technical Specification Group Radio Access Network, Evolved Universal Terrestrial Radio Access (E-UTRA); Radio Resource Control (RRC), Protocol Specification (Release 12)", 3GPP Standard; 3rd Generation Partnership Prokect (3GPP), Mobile Competence Centre ; 650, Route Des Lucioles ; F-06921 Sophia Antipolis Cedex ; France, vol. RAN WG2, No. V12.6.0, Jun. 30, 2015 (Jun. 30, 2015), pp. 1-449, XP050965796, [retrieved on Jun. 30, 2015] * chapters 3.2, 5.2.2.25, 5.3.5 5.3.10.15, 5.10 *.
"3rd Generation Partnership Project; Technical Specification Group Radio Access Network; Evolved Universal Terrestrial Radio Access (E-UTRA); Radio Resource Control (RRC); Protocol specification (Release 13)," 3GPP Standard; 3GPP TS 36.331, 3rd Generation Partnership Project (3GPP), Mobile Competence Centre ; 650, Route Des Lucioles ; F-06921 Sophia Antipolis Cedex ; France, vol. RAN WG2, No. V.13.2.0, Jun. 11, 2016 (Jun. 11, 2016), pp. 1-623, XP051123115, [retrieved on Jun. 11, 2016], Sections 5.2, 5.10, 9.3.
Ericsson: "Out of Coverage Discovery," 3GPP Draft; R2-153596—Out of Coverage Discovery, 3rd Generation Partnership Project (3GPP), Mobile Competence Centre ; 650, Route Des Lucioles ; F-06921 Sophia Antipolis Cedex ; France, vol. RAN WG2, No. Beijing, P.R. China; Aug. 24, 2015-Aug. 28, 2015 Aug. 23, 2015 (Aug. 23, 2015) XP051004287, Retrieved from the Internet: URL:http://www.3gpp.org/ftp/Meetings_3GPP_SYNC.RAN2/Docs [retrieved on Aug. 23, 2015] Section 3.
Huawei et al., "Alignment of ProSe Frequencies for Transmission and Reception," 3GPP Draft; R2-150085 Alignment of Prose Frequencies for Transmission and Reception, 3rd Generation Partnership Project (3GPP), Mobile Competence Centre ; 650, Route Des Lucioles ; F-06921 Sophia-Anti vol. RAN WG2, No. Turin, Italy; Jan. 14, 2015 Jan. 15, 2015 Feb. 8, 2015 (Feb. 8, 2015), XP050935456, Retrieved from the Internet: URL:http://www.3gpp.org/ftp/Meetings_3GPP_SYNC/RAN2/Docs/ [retrieved on Feb. 8, 2015], Section 2, 2 pages.
International Search Report and Written Opinion—PCT/US2016/051477—ISA/EPO—dated Nov. 29, 2016.
Kyocera: "Sidelink Gap Details for Direct Discovery," 3GPP Draft; R2-153338 Discovery-Gap, 3rd Generation Partnership Project (3GPP), Mobile Competence Centre ; 650, Route Des Lucioles ; F-06921 Sophia-Antipolis Cedex ; France 9 vol. RAN WG2, No. Beijing, China; Aug. 24, 2015-Aug. 28, 2015 Aug. 23, 2015 (Aug. 23, 2015), XP051004084, Retrieved from the Internet: URL:http://www.3gpp.org/ftp/Meetings_3GPP_SYNC/RAN2/Docs/ [retrieved on Aug. 23, 2015].
ZTE: "RAN2 Aspects of Supporting Out-of-coverage Discovery," 3GPP Draft; R2-153771 RAN2 Aspects of Supporting Out-of-Coverage Discovery. 3rd Generation Partnership Project (3GPP), Mobile Competence Centre ; 650, Route Des Lucioles ; F-06921 Sophia-Antipolis Ced vol. RAN WG2, No. Beijing, China; Aug. 24, 2015-Aug. 28, 2015 Aug. 23, 2015 (Aug. 23, 2015), XP051004416, Retrieved from the Internet: URL:http://www.3gpp.org/ftp/Meetings_3GPP_SYNC/RAN2/Docs/ [retrieved on Aug. 23, 2015], 3 pages.
3GPP TS 36.304: 3rd Generation Partnership Project; Technical Specification Group Radio Access Network; Evolved Universal Terrestrial Radio Access (E-UTRA); User Equipment (UE) Procedures in idle Mode (Release 12), V12.5.0 (Jun. 2015), pp. 1-38.
Taiwan Search Report—TW105129762—TIPO—dated Jan. 28, 2020.

\* cited by examiner

FREQUENCY DETERMINATION FOR DEVICE-TO-DEVICE TRANSMISSIONS AND RECEPTIONS

CROSS-REFERENCE TO RELATED APPLICATION(S)

This application claims the benefit of U.S. Provisional Application Ser. No. 62/219,043, entitled "FREQUENCY DETERMINATION FOR DEVICE-TO-DEVICE TRANSMISSIONS AND RECEPTIONS" and filed on Sep. 15, 2015, which is expressly incorporated by reference herein in its entirety.

BACKGROUND

Field

The present disclosure relates generally to communication systems, and more particularly, to a determination of a frequency for device-to-device transmissions and receptions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus selects a serving cell for connection to a network. The apparatus performs a search for a frequency band on a neighbor cell for use in device-to-device communications. The apparatus performs the device-to-device communications using pre-configured resources associated with the frequency band when the search for the frequency band on the neighbor cell fails. The apparatus performs the device-to-device communications using resources associated with the frequency band of the neighbor cell when the search for the frequency band on the neighbor cell is successful.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
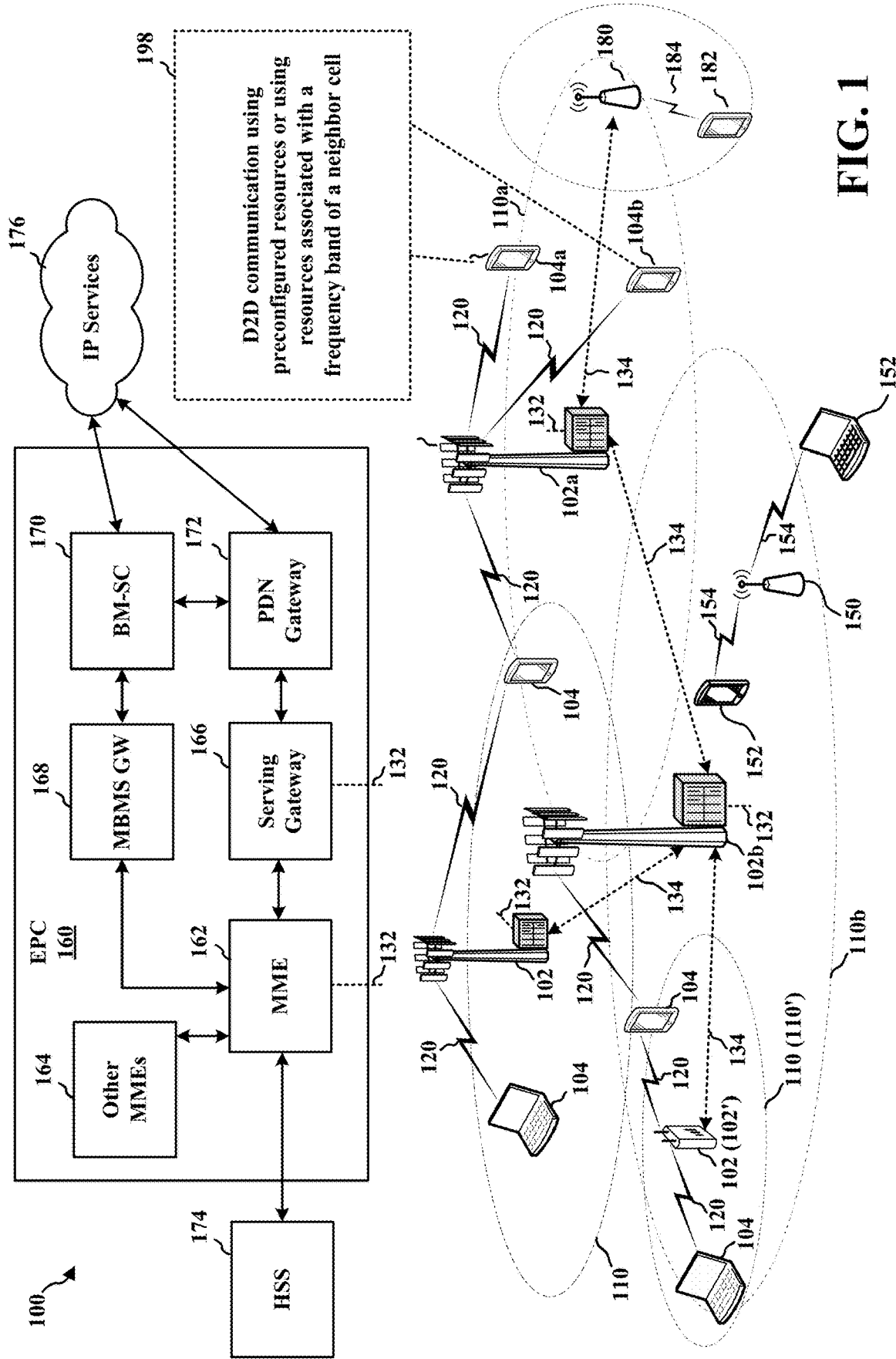
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MIME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first UE 104a may be operable to engage in device-to-device (D2D) communication 198 with a second UE 104b. In aspects, the first UE 104a and/or the second UE 104b may determine resources associated with a frequency band to use for the D2D communication 198. According to an aspect, the first UE 104a may select a serving cell 110a (e.g., a geographic coverage area) provided by a first eNB 102a for connection to a network. The first UE 104a may perform a search for a frequency band on a neighbor cell 110b, provided by a second eNB 102b, for use in the D2D communication 198.

When the search by the first UE 104a is successful (e.g., when the first UE 104a detects a network connection through the second eNB 102b and/or receives a system information from the second eNB 102b), then the first UE 104a may perform D2D communication 198 with the second UE 104b using resources associated with the frequency band of the neighbor cell 110b.

When the search by the first UE 104a is unsuccessful (e.g., when the first UE 104a is unable to detect a network connection through the second eNB 102b and/or the first UE 104a does not receive/is unable to decode system information from the second eNB 104), then the first UE 104a may perform D2D communication 198 with the second UE 104b using preconfigured resources (e.g., preconfigured resources associated with a frequency band of the neighbor cell 104b). The first UE 104a may store information associated with the preconfigured resources and/or may determine the preconfigured resources based on previous communication with the second eNB 104b).

Figure 2:
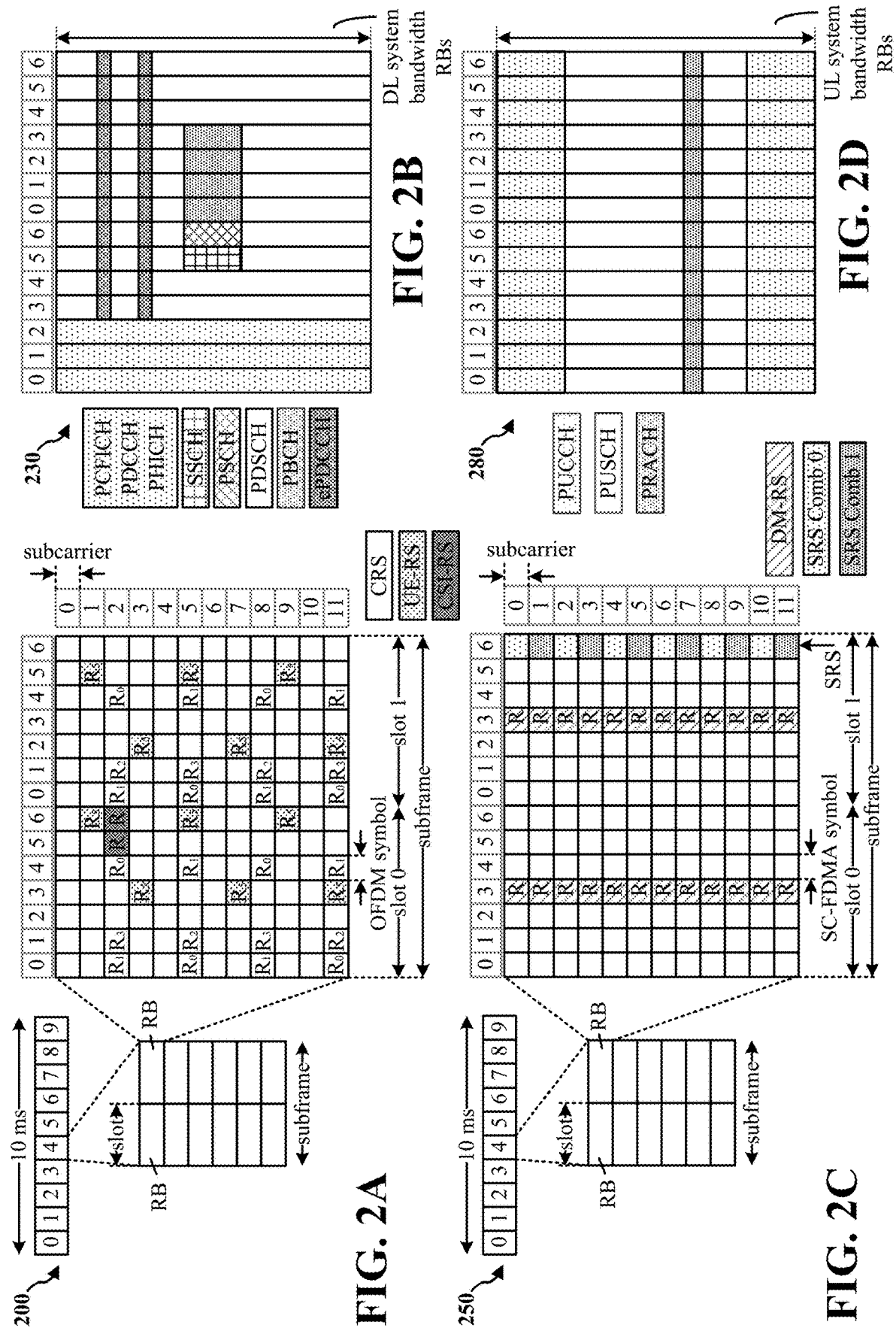
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as RS), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
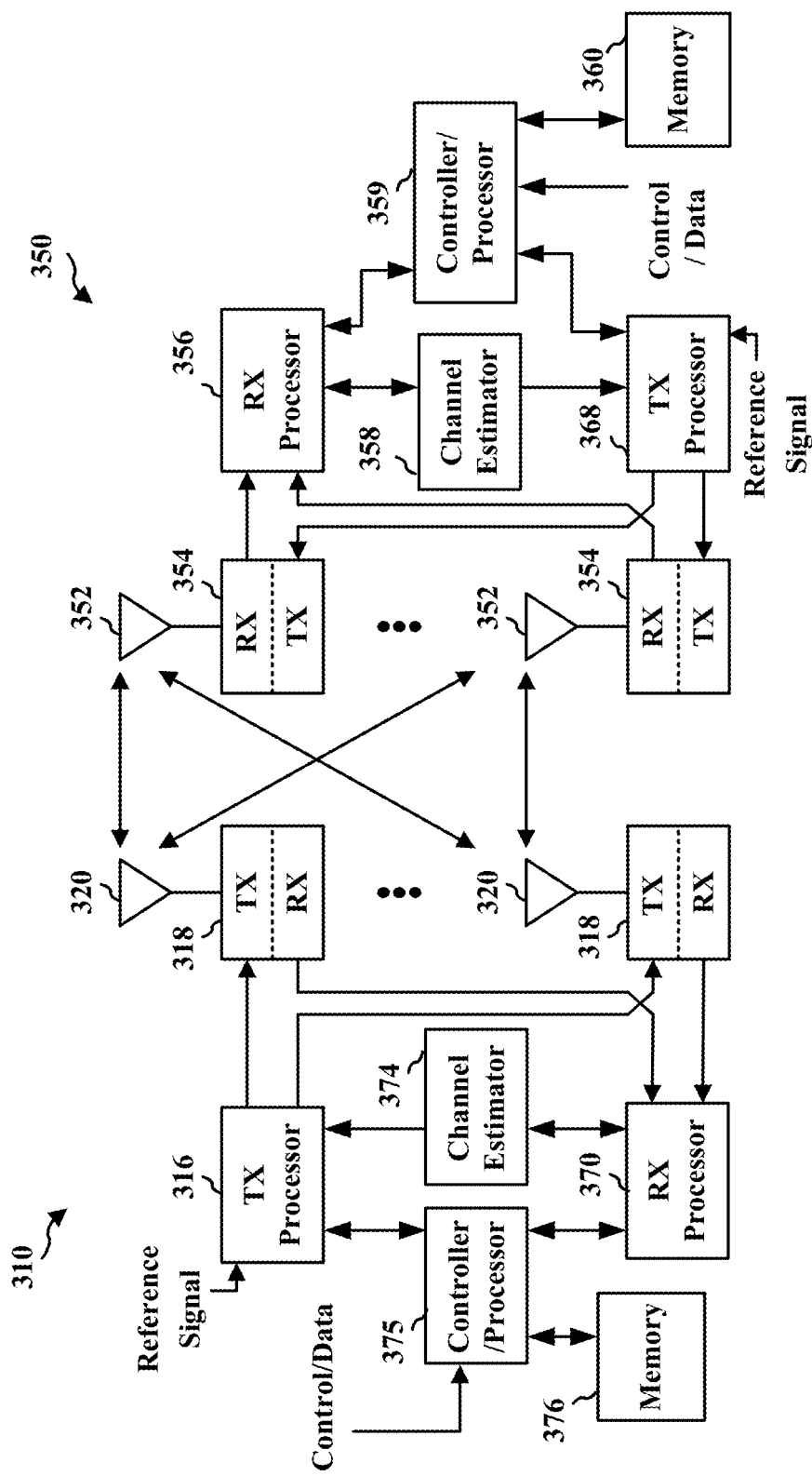
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
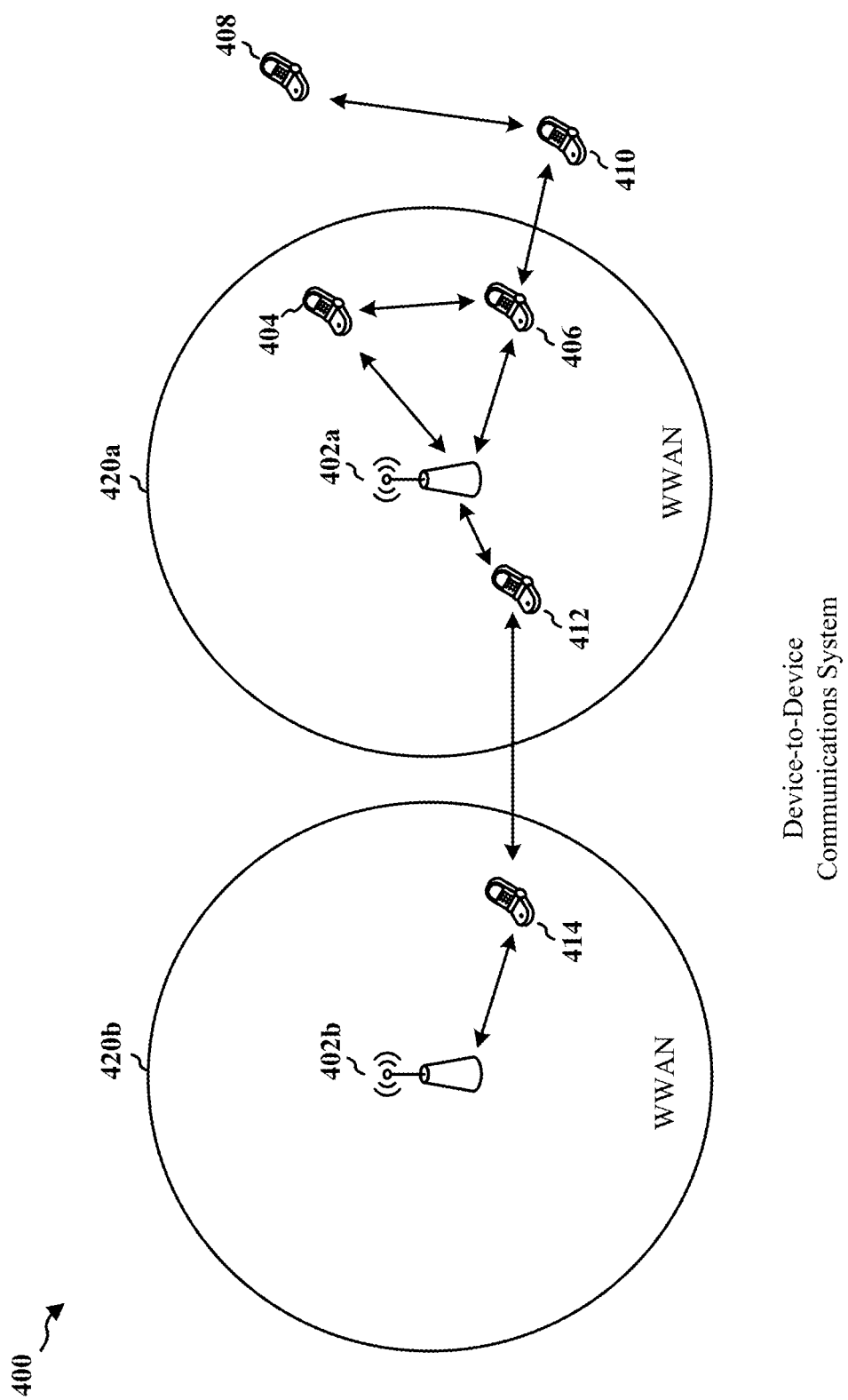
FIG. 4 is a diagram of an aspect of a wireless communications system.

FIG. 4 is a diagram of a device-to-device communications system 400. The device-to-device communications system 400 includes a plurality of wireless devices 404, 406, 408, 410, 412, 414. The device-to-device communications system 400 may overlap with a cellular communications system, such as for example, a wireless wide area network (WWAN). Some of the wireless devices 404, 406, 408, 410, 412, 414 may communicate together in device-to-device communication (e.g., ProSe communication) using the DL/UL WWAN spectrum of a serving cell 420a, the DL/UL WWAN spectrum of a neighbor cell 420b, both the DL/UL WWAN spectrum of the serving cell 420a (e.g., device-to-device transmissions) and the DL/UL WWAN spectrum of a neighbor cell 420b (e.g., device-to-device receptions), a frequency band employed by the network but not emanating from a base station 402a, 402b, and some may communicate with the base station 402a, 402b. For example, as shown in FIG. 4, the wireless devices 408, 410 are in device-to-device communication outside of coverage of any cell. In an aspect, the wireless devices 404, 406 are in device-to-device communication in coverage of a single cell (e.g., serving cell 420a). Wireless devices 406, 410 are in device-to-device communication in partial coverage (e.g., wireless device 406 is in coverage of serving cell 420a and wireless device 410 is not in coverage of any cell). In another aspect, wireless devices 412, 414 are in device-to-device communication in a multi-cell coverage scenario. For example, wireless device 412 is in serving cell 420a and wireless device 414 is in neighbor cell 420b. In addition, the wireless devices 404, 406, 412 are also communicating with the base station 402a, and wireless device 414 is communicating with base station 402b.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Conventional device-to-device communication procedures are defined such that device-to-device transmissions are performed on the camped Band/Frequency while LTE-D Code receptions (Rx) can be performed on the same frequency. However, there are certain limitations with this conventional approach. For example, a network operator (e.g., AT&T, Sprint, Verizon, etc.) may deploy LTE-D only on 1 frequency of a frequency band even if the frequency band has 20 frequencies deployed. If all wireless devices in a serving cell camp on that frequency to perform LTE-D transmissions and/or receptions (Tx/Rx), cell overload scenarios may occur. Therefore, the present disclosure provides for the scenario when a wireless device wishes to perform LTE-D discovery on a D2D frequency band of a neighbor cell or even when not the frequency band is in network coverage. This approach may be particularly useful when the network operator has deployed LTE-D in a band there is sparsely deployed.

Figure 5:
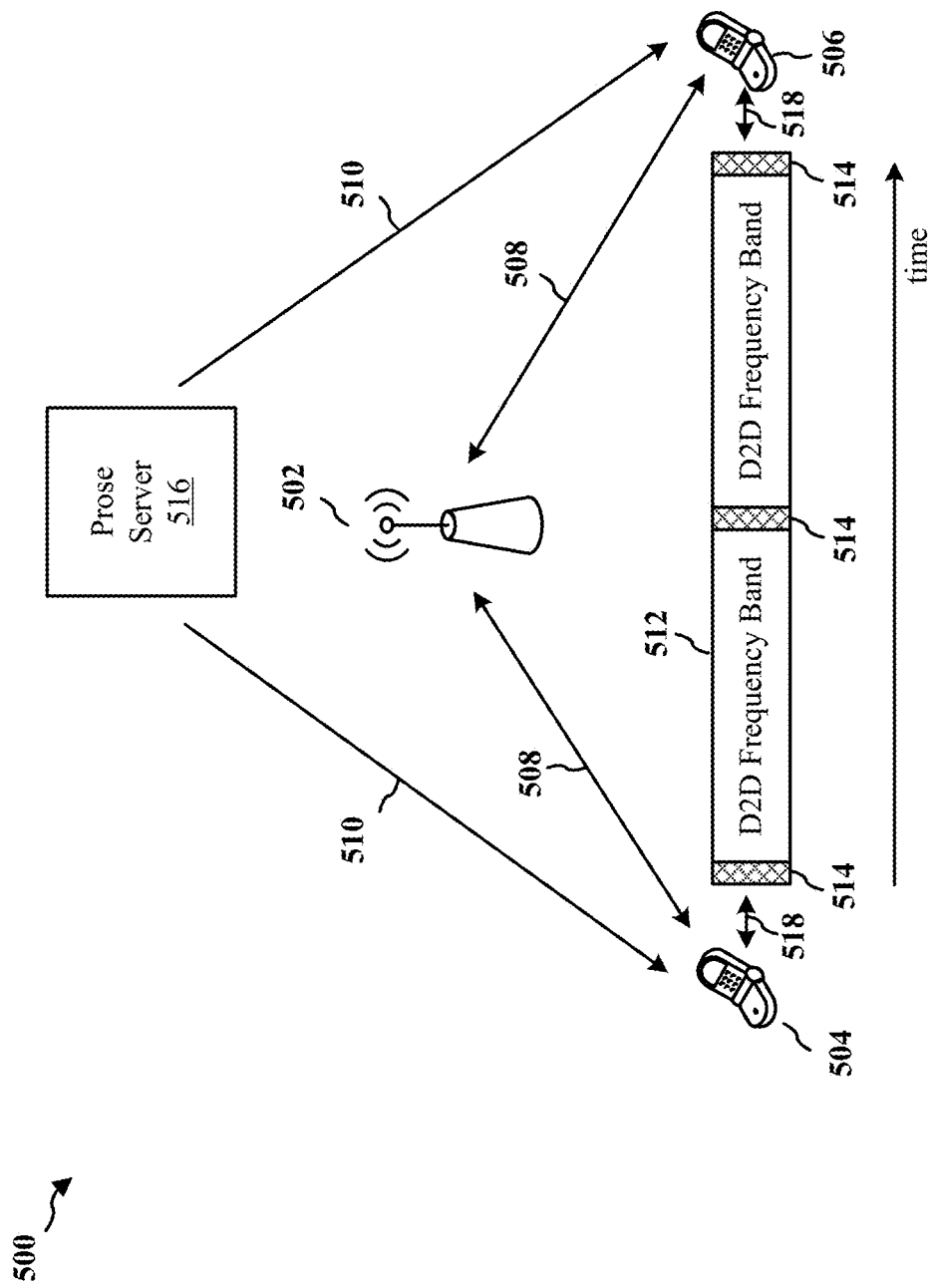
FIG. 5 is a diagram of an aspect of a wireless communications system that includes device-to-device communication.

FIG. 5 is a diagram of a device-to-device communications system 500 that may not use an infra-frequency communication protocol. For example, one or more of wireless devices 504, 506 can perform LTE-D discovery 518 on a small fraction of a device-to-device (D2D) frequency band 512 using discovery resources 514. In an aspect, the wireless devices 504, 506 conduct LTE voice and data traffic 508 with base station 502 using a frequency band that may be different than the D2D frequency band 512. The timing and resource information for LTE voice and data traffic 508 may be received by the wireless devices 504, 506 from the base station 502. For example, the LTE voice and data traffic 508 may use frequency band 3, and device-to-device communications between wireless devices 504, 506 may use frequency band 41. However, any other frequency band may be used without departing from the scope of the present disclosure. In the example illustrated in FIG. 5, each of the wireless devices 504, 506 may receive over the top (OTT) discovery resource information 510 related to the D2D frequency band from a Prose Server 516 (e.g., open mobile alliance device management). The OTT discovery resource information 510 may include information related to the resources and timing offset necessary to discover resources 514 for use in device-to-device communications using D2D frequency band 512. Each of the wireless devices 504, 506 may then tune away from the home public land mobile network (PLMN) (e.g., tune away from base station 502) and begin an LTE-D discovery procedure 518 prior to conducting device-to-device communication using D2D frequency band 512.

Figure 6:
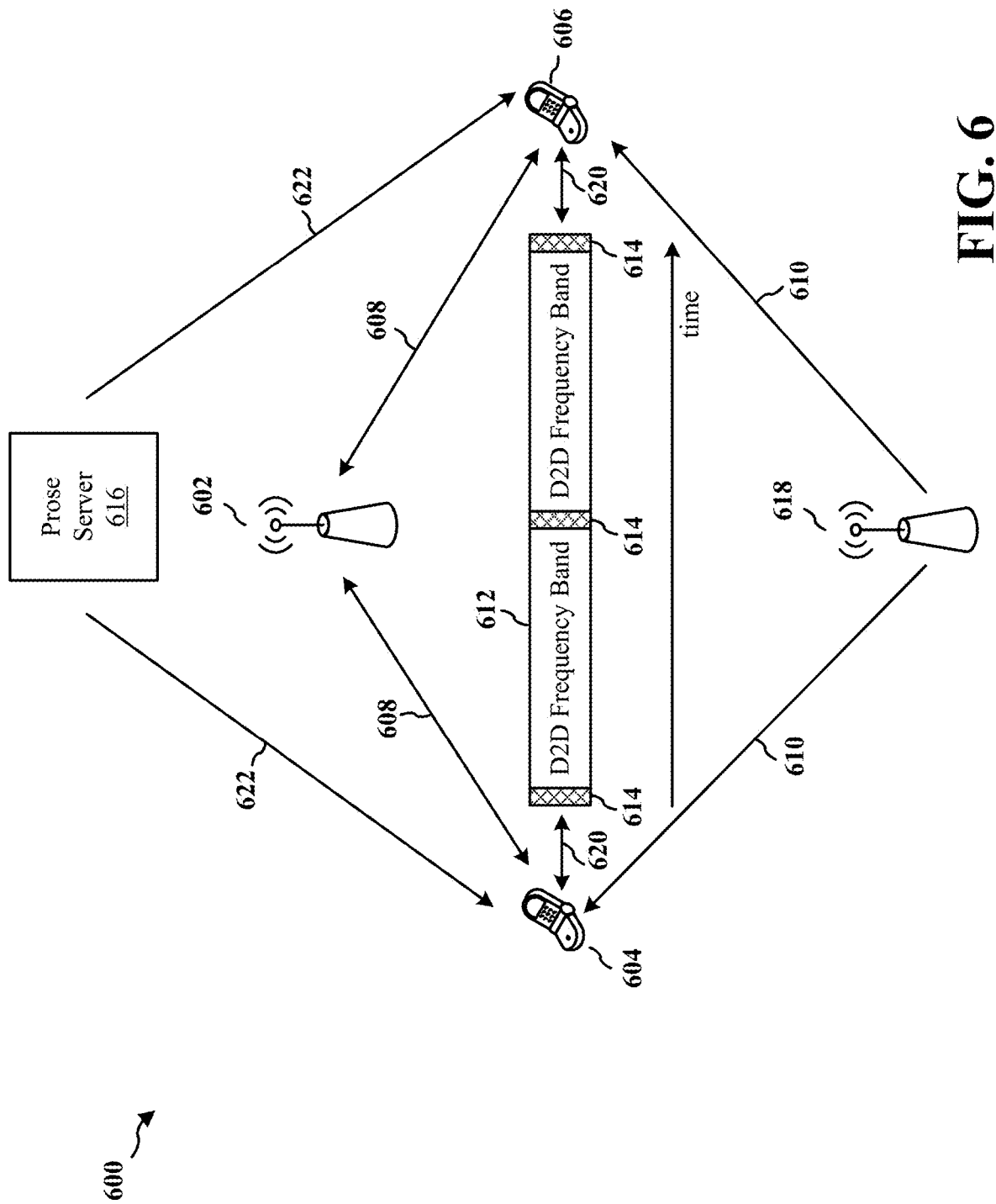
FIG. 6 is a diagram of an aspect of a wireless communications system that includes device-to-device communication.

FIG. 6 is a diagram of a device-to-device communications system 600 that may use an infra-frequency communication protocol. For example, one or more of wireless devices 604, 606 can perform LTE-D discovery 620 on a small fraction of the D2D frequency band 612 using discovery resources 614. In an aspect, the D2D frequency band 612 may also be a frequency band employed by neighbor base station 618 for WWAN traffic. In an aspect, the wireless devices 604, 606 conduct LTE voice and data traffic 608 with serving base station 602 using a frequency band that may be different than the D2D frequency band 612. The discovery resource information 610 (e.g., timing and resource information) for LTE voice and data traffic 608 may be received by the wireless devices 604, 606 from the serving base station 602. For example, the LTE voice and data traffic 608 may use frequency band 3, and device-to-device communications between wireless devices 604, 606 may use frequency band 41. However, any other frequency band may be used without departing from the scope of the present disclosure. In an aspect, discovery resource information 610 may be broadcast from the neighbor base station 618 to the wireless devices 604, 606. For example, the discovery resource information 610 may be broadcast in a system information block (SIB) 16. A SIB 16 provided by the neighbor base station 618 may overwrite an OTT configuration 622 sent by the Prose Server 616. The wireless devices 604, 606 may tune away from the home FDD PLMN to perform discovery 620 in the D2D frequency band 612 using discovery resource information 610 (e.g., resource and/or timing offset information) provided in the SIB 16 from the neighbor base station 618 (e.g., a TDD base station).

Figure 7:
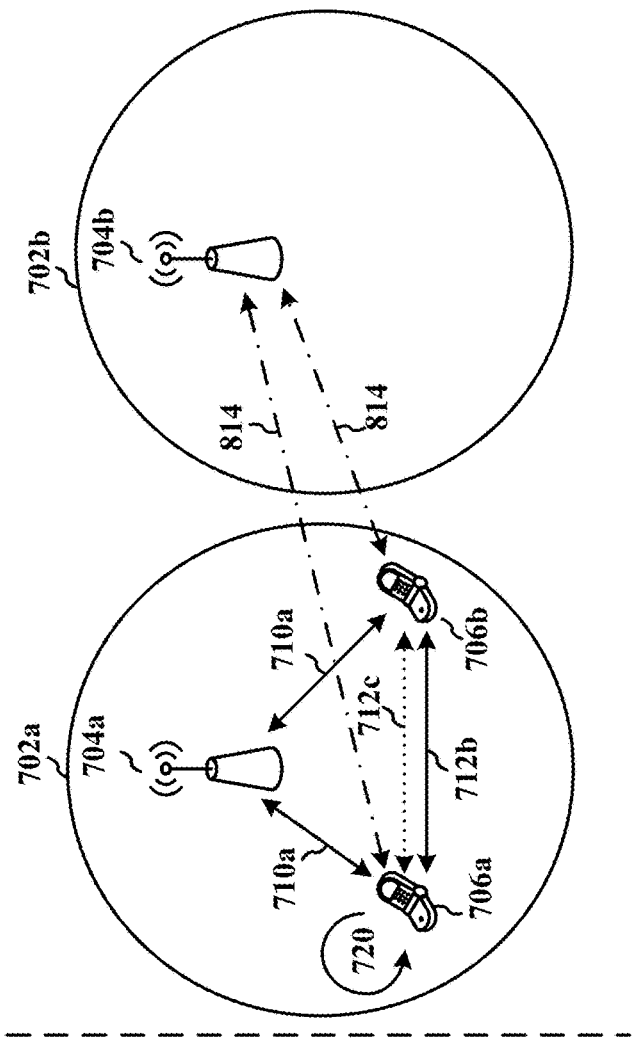
FIG. 7 is a diagram of an aspect of a wireless communications system that includes device-to-device communication.

FIG. 7 is a diagram of a device-to-device communications system 700 that enables a wireless device to dynamically switch between various models of an LTE-D discovery operation. The device-to-device communications system 700 may include a plurality of wireless devices 706a, 706b camped in serving cell 702a and performing LTE voice and data communications 710a with serving base station 704a. In addition, wireless devices 706a, 706b may perform device-to-device communications 712a, 712b, 712c based on several models illustrated with respect to "MODEL A" and "MODELS B/C".

Referring still to FIG. 7, each of the wireless devices 706a, 706b may determine 720 (e.g., select) the serving cell 702a for connection to a network, and communicate with the network via the serving base station 704a. In an aspect, the network may be an LTE wireless communications network. To perform device-to-device communications, one or more of the wireless devices 706a, 706b may perform a search for a frequency band on a neighbor cell 702b for use in performing device-to-device communications. For example, the frequency band may be the D2D frequency band described with reference to FIGS. 5 and 6.

Figure 8:
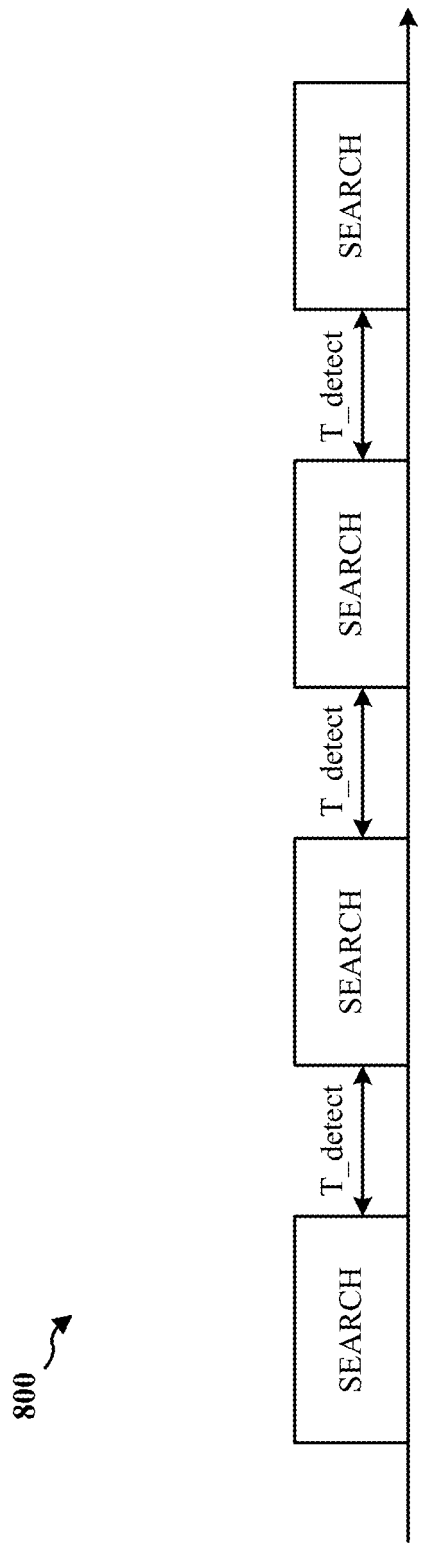
FIG. 8 is a diagram of an aspect of a wireless communications system that includes device-to-device communication.

FIG. 8 is a diagram of an inter-frequency neighbor cell search/detection procedure 800 that may be performed by the wireless devices 706a, 706b illustrated in FIG. 7. For example, if an initial search does not result in an inter-frequency neighbor cell detection, the wireless devices 706a, 706b may increase the time period T_detect by Δ1 seconds in the case of multiple search failures. However, the wireless devices 706a, 706b may not increase the time period T_detect if "MODEL A" is configured for device-to-device communications using the frequency band of the serving cell 702a.

Referring again to FIG. 7, if the D2D frequency band is not detected on the neighbor cell 702b, the wireless device 706a, 706b may perform the device-to-device communications 712a using pre-configured resources associated with the frequency band, as illustrated with respect to "MODEL A" in FIG. 7. For example, the wireless devices 706a, 706 may determine 720 that the search for the frequency band on the neighbor cell 702b has failed when a network connection is not detected after a predetermined number of searches.

Referring still to "MODEL A", the wireless devices 706a, 706b may determine 720 if a network connection was previously established with the neighbor cell 702b if the search for the frequency band on the neighbor cell fails. In this scenario, the wireless devices 706a, 706b may still perform the device-to-device communications 712a using the pre-configured resources of "MODEL A" associated with the frequency band when the search for the frequency band on the neighbor cell fails based on a confidence level metric.

For example, the confidence level metric may take into account 1) past determinations (e.g., N times out of K searches in the currently camped serving cell 702a resulted in detection of a neighbor cell 702b in the D2D frequency band/eutra absolute radio frequency channel number) or a filtered value (e.g., infinite impulse response filter value) of such determinations exceeding a threshold, 2) signal strength from various cell sites when a neighbor cell 702b was detected, and/or 3) the size of the serving cell 702a on which the wireless device(s) 706a, 706b are camped. In an aspect, past determinations may take into account cell sites including Wi-Fi, basic service set identification (BSSID), or cellular sites (e.g. CDMA, Evolution Data Optimized (EVDO), GSM, UMTS, TDSCDMA, or LTE).

Referring still to "MODEL A", the device-to-device communications 712a may be performed using a pre-configured offset timing when the determination 720 (e.g., search) for the frequency band on the neighbor cell 702b fails. Each of the wireless devices 706a, 706b may receive OTT discovery resource information related to the D2D frequency band from a Prose Server 816, as illustrated in FIG. 8. The OTT discovery resource information may include information related to the resources and timing offset necessary to discover resources for use in device-to-device communications 712a using the D2D frequency band. The discovery resource information may alternatively or additionally be pre-configured in a subscriber identity module (SIM) card of the wireless devices 706a, 706b. Each of the wireless devices 706a, 706b may tune away from the PLMN of the serving cell 702a and begin a determination 720 (e.g., an LTE-D discovery procedure) prior to device-to-device communication 712a using the D2D frequency band. For example, both the device-to-device transmissions and the device-to-device receptions may be performed on the D2D frequency band in "MODEL A".

With further reference to "MODEL A", if there is more than one frequency available in the D2D frequency band for performing the device-to-device communications 712a, the wireless devices 706a, 706b may select a frequency for use in the device-to-device communications 712a from a list of frequencies based on a preconfigured priority of frequencies and/or based on previous use. While performing device-to-device communications using "MODEL A" the wireless devices 706a, 706b may still periodically perform a search for the D2D frequency band on a neighbor cell.

Referring now to "MODELS B/C" in FIG. 7, if the D2D frequency band is detected on the neighbor cell 702b, the wireless device 706a, 706b may perform the device-to-device communications 712b, 712c using resources associated with the frequency band of the neighbor cell 702b when the determination 720 (e.g., search) for the D2D frequency band on the neighbor cell 702b is successful. In an aspect, the wireless devices 706a, 706b may determine 720 that the search for the frequency band on the neighbor cell 702b is successful when a network connection is detected within a predetermined number of determinations 720 (e.g., searches). Moreover, the D2D frequency band may be detected on more than one neighbor cell. In this case, the wireless device 706a, 706b may perform device-to-device communications 712b, 712c using resources associated with the D2D frequency band of one or of the neighbor cells on which the D2D frequency band is detected.

In an aspect, the device-to-device communications 712b, 712c are performed according to "MODELS B/C" using the resources associated with the frequency band of the neighbor cell 702b. Information related to the resources associated with the frequency band of the neighbor cell 702b may be receive in a SIB19 814 broadcast in an overhead message from the neighbor base station 704b. While the SIB19 814 is described herein as SIB19, another SIB(s) may convey the information without departing from the present disclosure.

Referring to "MODEL B" in FIG. 7, the wireless devices 706a, 706b may perform one or more of device-to-device transmissions or device-to-device receptions 712b using the frequency band of the neighbor cell, and perform the other one of the device-to-device transmissions or device-to-device receptions 712b using the D2D frequency band of the neighbor cell 702.

Referring to "MODEL C" in FIG. 7, the wireless devices 706a, 706b may perform device-to-device transmissions 712c using the D2D frequency band of the serving cell 702a, and perform device-to-device receptions 712b using the D2D frequency band of the neighbor cell 702b. Alternatively, the device-to-device transmissions may be performed using the D2D frequency band of the neighbor cell 702b, and the device-to-device receptions may be performed using the D2D frequency band of the serving cell 702a. In either case, the wireless devices 706a, 706b may perform the device-to-device communications 712b and/or 712c using resources associated with the D2D frequency band of the neighbor cell 702b by selecting a neighbor frequency based on priority information received in the SIB19 814 from the neighbor base station 704b.

While performing device-to-device communications using "MODELS B/C" once the D2D frequency band on the neighbor cell 702b is detected, the wireless device 706a, 706b may schedule SIB1, SIB2, and/or SIB19 decoding to determine if a tag associated with system information (e.g., SystemInfoValueTag) has changed. When the tag has changed, the wireless device 706a, 706b may need to decode one or more SIBs (e.g., SIB1, SIB2, and/or SIB19). However, in performing device-to-device communications using "MODELS B/C" the wireless devices 706a, 706b may not be required to perform a search for the D2D frequency band on the neighbor cell 702b again unless the SIB1, SIB2, and/or SIB19 cannot be decoded.

In either "MODEL A", "MODEL B", or "MODEL C", the wireless device 706a, 706b may determine that the device-to-device communications are not allowed on the D2D frequency band for which the search of the neighbor cell 702b is being conducted. In this scenario, the wireless device 706a, 706b may stop the search in order to conserve battery power.

In an aspect, a wireless device 706a, 706b may be configured to determine prioritization between "MODEL A", "MODEL B", and "MODEL C." For example, a wireless device 706a, 706b may be configured with a policy that prioritizes "MODEL A", "MODEL B", and "MODEL C" with respect to one another. This policy may indicate precedence ordering for selecting an appropriate model of operation (e.g., according to a policy, "MODEL A" is to be selected before "MODEL B" when possible, and "MODEL B" is to be selected before "MODEL C").

In this way, the present disclosure provides for the scenario when a wireless device wishes to perform LTE-D discovery on a D2D frequency band of a neighbor cell or even when not the frequency band is in network coverage. This may be particularly useful when the network operator has deployed LTE-D in a band there is sparsely deployed.

Figure 9:
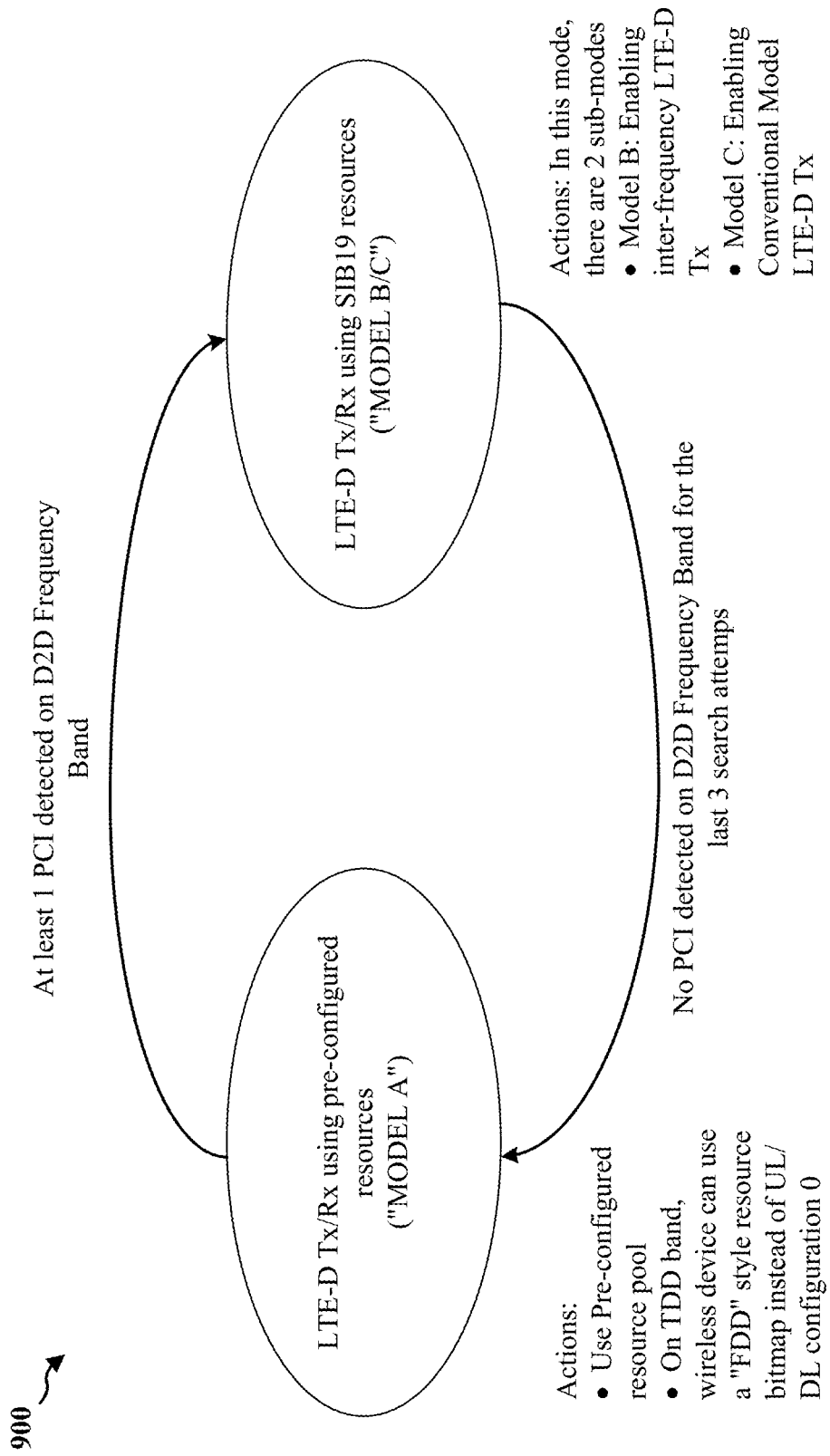
FIG. 9 is a diagram of an aspect of an inter-frequency neighbor cell search/detection procedure.

FIG. 9 is a diagram of a procedure 900 for determining whether to perform device-to-device communications using "MODEL A" or one of "MODELS B/C" illustrated in FIG. 7. For example, the procedure 900 may determine whether to perform inter-frequency device-to-device transmissions/receptions (Tx/Rx) using a pre-configured resource pool for the D2D frequency band, or a resource pool configured by the SIB 19 received from the neighbor base station. This may enable a dynamic switch between one of "MODELS B/C" and "MODEL A" based on an absence of a neighbor cell using the D2D frequency band. For example, when no neighbor cell physical cell ID (PCI) is detected on the D2D frequency band upon multiple searches failures, the wireless devices 706a, 706b may use the pre-configured resource pool instead of the pool received via SIB19 (i.e., switch from one of "MODELS B/C" to "MODEL A"). Alternatively, when a neighbor cell PCI is detected on the D2D frequency band, the wireless devices 706a, 706b may use the resource pool received via SIB19 from the neighbor base station instead of the pre-configured resource pool. The use of one of "MODELS B/C" may be contingent on SIB19 resource availability on the neighbor cell.

Still referring to FIG. 9, in some instances a PCI may be detected but the decoding of the master information block (MIB)/SIB1 by the wireless device 706a, 706b may fail. In one instance, when the wireless device 706a, 706b detects a PCI regardless of whether the MIB/SIB1 can cause the wireless device 706a, 706b to disable device-to-device communications using "MODEL A". Alternatively, there could be alternate scenarios where device-to-device communications are allowed using "MODEL A" if PCI detection succeeds and decoding of the MIB/SIB1 fails a certain number of times. In such cases, if fingerprinted data of potential cell sites is available around the given serving cell, the wireless device 706a, 706b may choose to use the serving cell frequency band when using "MODEL A" instead of a different D2D frequency band as normally used with pre-configured resources.

Figure 10A:
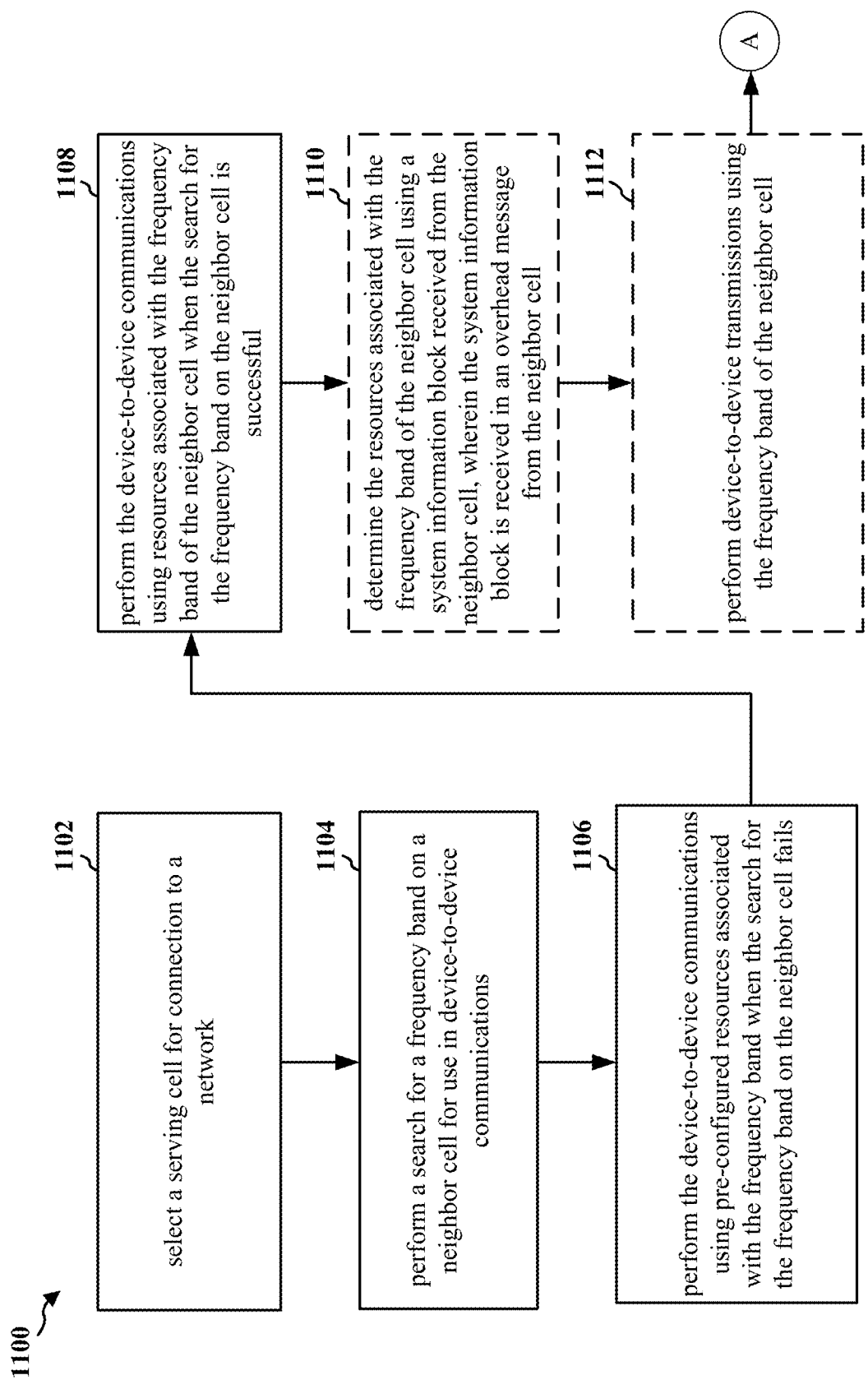
FIGS. 10A-10C are a flow chart of a method of wireless communication in accordance with various aspects.
Figure 10B:
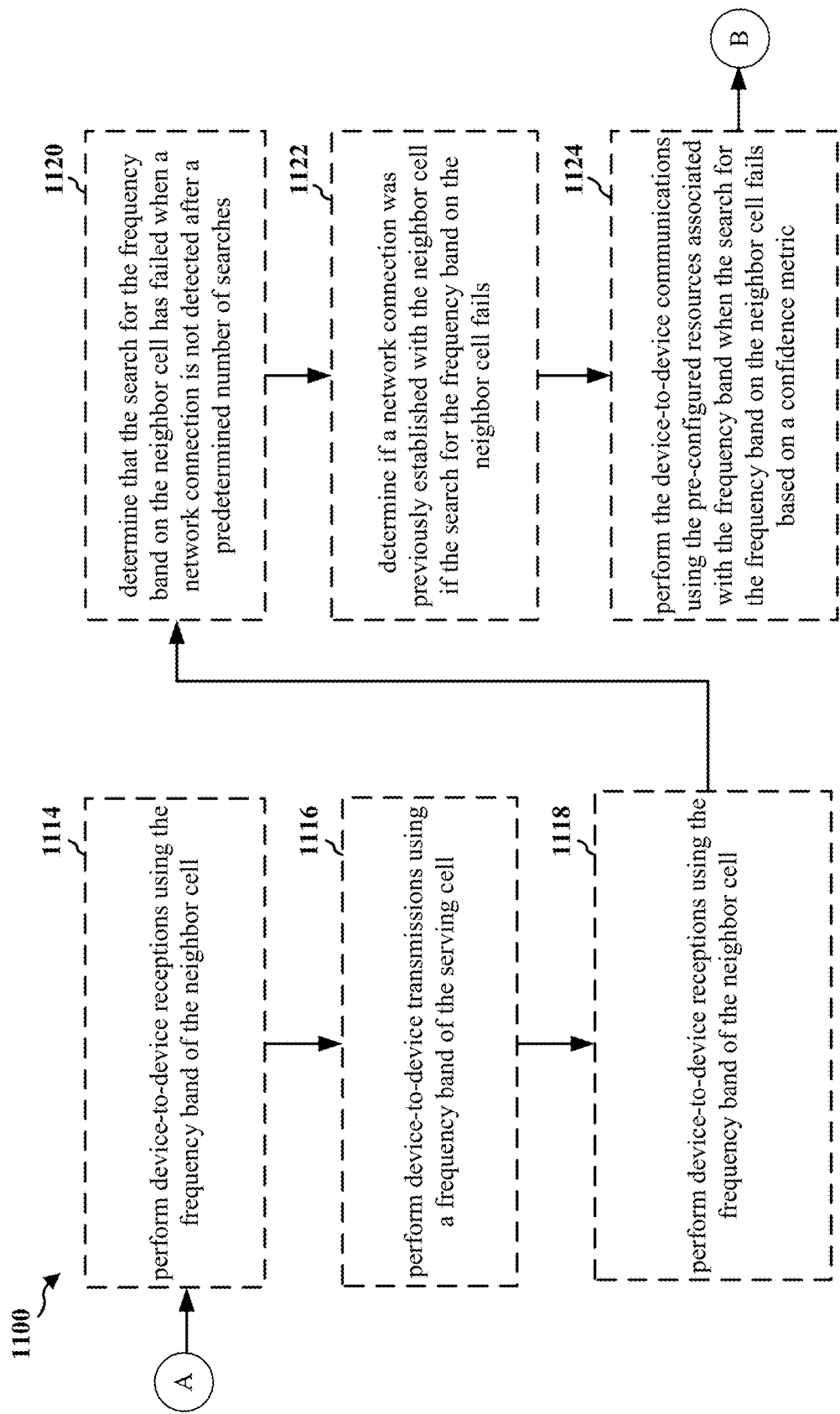
Figure 10C:
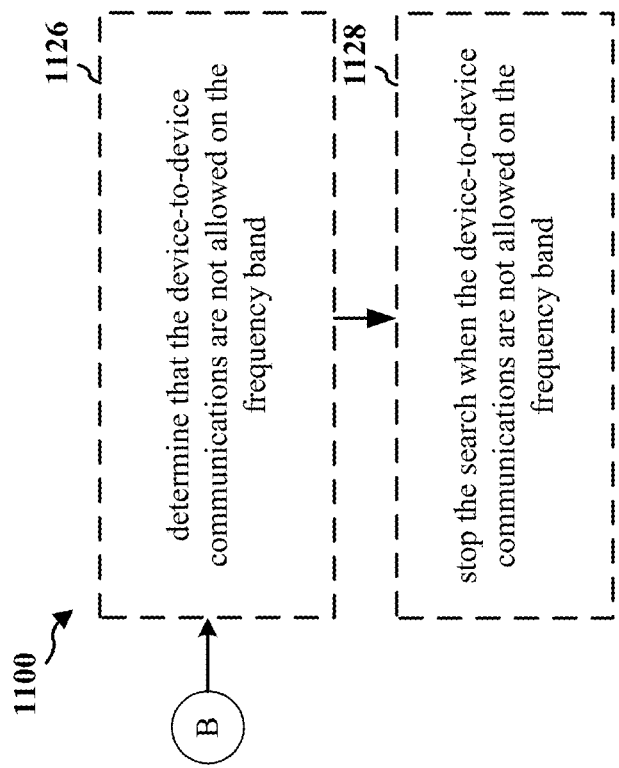

FIGS. 10A-10C are a flow chart 1100 of a method of wireless communication in accordance with various aspects. The method may be performed by a wireless device, such as wireless device 706a, 706b. It should be understood that the operations indicated with dashed lines represent operations for various aspects of the disclosure.

In operation 1102, a wireless device selects a serving cell for connection to a network. For example, referring to FIG. 7, each of the wireless devices 706*a*, 706*b* may determine 720 (e.g., select) the serving cell 702*a* for connection to a network, and communicate with serving base station 704*a* using the network.

In operation 1104, the wireless device performs a search for a frequency band on a neighbor cell for use in device-to-device communications. For example, referring to FIG. 7, one or more of the wireless devices 706*a*, 706*b* may perform a search for a frequency band on a neighbor cell 702*b* for use in performing device-to-device communications. For example, the frequency band may be the D2D frequency band described with reference to FIGS. 8 and 9.

In operation 1106, the wireless device performs the device-to-device communications using pre-configured resources associated with the frequency band when the search for the frequency band on the neighbor cell fails. For example, referring to FIG. 7, if the D2D frequency band is not detected on the neighbor cell 702*b*, the wireless device 706*a*, 706*b* may perform the device-to-device communications 712*a* using pre-configured resources associated with the D2D frequency band, as illustrated with respect to "MODEL A".

In operation 1108, the wireless device performs the device-to-device communications using resources associated with the frequency band of the neighbor cell when the search for the frequency band on the neighbor cell is successful. For example, referring to FIG. 7, the wireless devices 706*a*, 706*b* may perform device-to-device transmissions 712*b* using the frequency band of the neighbor cell 702*b*, and perform device-to-device receptions 712*b* using the D2D frequency band of the neighbor cell 702*b*.

In operation 1110, the wireless device determines the resources associated with the frequency band of the neighbor cell using a system information block received from the neighbor cell, wherein the system information block is received in an overhead message from the neighbor cell. For example, referring to FIG. 7, the device-to-device communications 712*b*, 712*c* are performed according to "MODELS B/C" using the resources associated with the frequency band of the neighbor cell 702*b* based on a SIB19 814 received from the neighbor cell 702*b*. In an aspect, the SIB19 814 may be received in an overhead message from the neighbor base station 704*b*.

In operation 1112, the wireless device performs device-to-device transmissions using the frequency band of the neighbor cell. For example, referring to "MODEL B" illustrated in FIG. 7, the wireless devices 706*a*, 706*b* may perform one or more of device-to-device transmissions or device-to-device receptions 712*b* using the frequency band of the neighbor cell, as illustrated with respect to "MODELS B/C".

As shown in FIG. 10B, in operation 1114, the wireless device performs device-to-device receptions using the frequency band of the neighbor cell. For example, referring to "MODEL B" illustrated FIG. 7, the wireless device 706*a*, 706*b* may perform the other one of the device-to-device transmissions or device-to-device receptions 712*b* using the D2D frequency band of the neighbor cell 702*b*.

In operation 1116, the wireless device performs device-to-device transmissions using a frequency band of the serving cell. For example, referring to "MODEL C" illustrated in FIG. 7, the wireless devices 706*a*, 706*b* may perform device-to-device transmissions 712*c* using the D2D frequency band of the serving cell 702*a*, and perform device-to-device receptions 712*b* using the D2D frequency band of the neighbor cell 702*b*. Alternatively, the device-to-device transmissions may be performed using the D2D frequency band of the neighbor cell 702*b*, and the device-to-device receptions may be performed using the D2D frequency band of the serving cell 702*a*. In either case, the wireless devices 706*a*, 706*b* may perform the device-to-device communications 712*b* and/or 712*c* using resources associated with the D2D frequency band of the neighbor cell 702*b* by selecting a neighbor frequency based on priority information received in the SIB19 814 received from the neighbor base station 704*b*.

In operation 1118, the wireless device performs device-to-device receptions using the frequency band of the neighbor cell. For example, referring to "MODEL C" illustrated in FIG. 7, the wireless devices 706*a*, 706*b* may perform device-to-device transmissions 712*c* using the D2D frequency band of the serving cell 702*a*, and perform device-to-device receptions 712*b* using the D2D frequency band of the neighbor cell 702*b*. Alternatively, the device-to-device transmissions may be performed using the D2D frequency band of the neighbor cell 702*b*, and the device-to-device receptions may be performed using the D2D frequency band of the serving cell 702*a*. In either case, the wireless devices 706*a*, 706*b* may perform the device-to-device communications 712*b* and/or 712*c* using resources associated with the D2D frequency band of the neighbor cell 702*b* by selecting a neighbor frequency based on priority information received in the SIB19 814 received from the neighbor base station 704*b*.

In operation 1120, the wireless device determines that the search for the frequency band on the neighbor cell has failed when a network connection is not detected after a predetermined number of searches. For example, referring to FIG. 7, to perform device-to-device communications, one or more of the wireless devices 706*a*, 706*b* may perform a search for a frequency band on a neighbor cell 702*b* for use in performing device-to-device communications. For example, the frequency band may be the D2D frequency band described with reference to FIGS. 5 and 6. For example, referring to FIG. 8, if an initial search does not result in an inter-frequency neighbor cell detection, the wireless devices 706*a*, 706*b* may increase the time period T_detect by Δ1 seconds in the case of multiple search failures.

In operation 1122, the wireless device determines if a network connection was previously established with the neighbor cell if the search for the frequency band on the neighbor cell fails. For example, referring to FIG. 7, the wireless devices 706*a*, 706*b* may determine 720 if a network connection was previously established with the neighbor cell 702*b* if the search for the frequency band on the neighbor cell fails. In this scenario, the wireless devices 706*a*, 706*b* may perform the device-to-device communications 712*a* using the pre-configured resources of "MODEL A" associated with the frequency band when the search for the frequency band on the neighbor cell fails based on a confidence level metric. For example, the confidence level metric may take into account 1) past determinations (e.g., N times out of K searches in the currently camped serving cell 702*a* resulted in detection of a neighbor cell 702*b* in the pre-configured band/eutra absolute radio frequency channel number) or a filtered value (e.g., infinite impulse response filter value) of such determinations exceeding a threshold, 2) signal strength from various cell sites when a neighbor cell 702*b* was detected, and/or 3) the size of the serving cell 702*a* on which the wireless device(s) 706*a*, 706*b* are camped. In an aspect, past determinations may take into account cell sites including Wi-Fi, basic service set identification (BSSID) or cellular sites (e.g. CDMA, Evolution Data Optimized (EVDO), GSM, UMTS, TDSCDMA, or LTE).

In operation 1124, the wireless device performs the device-to-device communications using the pre-configured resources associated with the frequency band when the search for the frequency band on the neighbor cell fails based on a confidence metric. For example, referring to FIG. 7, the wireless devices 706a, 706b may determine 720 if a network connection was previously established with the neighbor cell 702b if the search for the frequency band on the neighbor cell fails. In this scenario, the wireless devices 706a, 706b may perform the device-to-device communications 712a using the pre-configured resources of "MODEL A" associated with the frequency band when the search for the frequency band on the neighbor cell fails based on a confidence level metric. For example, the confidence level metric may take into account 1) past determinations (e.g., N times out of K searches in the currently camped serving cell 702a resulted in detection of a neighbor cell 702b in the pre-configured band/eutra absolute radio frequency channel number) or a filtered value (e.g., infinite impulse response filter value) of such determinations exceeding a threshold, 2) signal strength from various cell sites when a neighbor cell 702b was detected, and/or 3) the size of the serving cell 702a on which the wireless device(s) 706a, 706b are camped. In an aspect, past determinations may take into account cell sites including Wi-Fi, basic service set identification (BSSID) or cellular sites (e.g. CDMA, Evolution Data Optimized (EVDO), GSM, UMTS, TDSCDMA, or LTE).

As shown in FIG. 10C, in operation 1126, the wireless device determines that the device-to-device communications are not allowed on the frequency band. For example, referring to FIG. 7, in either "MODEL A", "MODEL B", or "MODEL C", the wireless device 706a, 706b may determine that the device-to-device communications are not allowed on the D2D frequency band for which the search of the neighbor cell 702b is being conducted. In this scenario, the wireless device 706a, 706b may stop the search in order to conserve battery power.

In operation 1128, the wireless device stops the search when the device-to-device communications are not allowed on the frequency band. For example, referring to FIG. 7, in either "MODEL A", "MODEL B", or "MODEL C", the wireless device 706a, 706b may determine that the device-to-device communications are not allowed on the D2D frequency band for which the search of the neighbor cell 702b is being conducted. In this scenario, the wireless device 706a, 706b may stop the search in order to conserve battery power.

Figure 11:
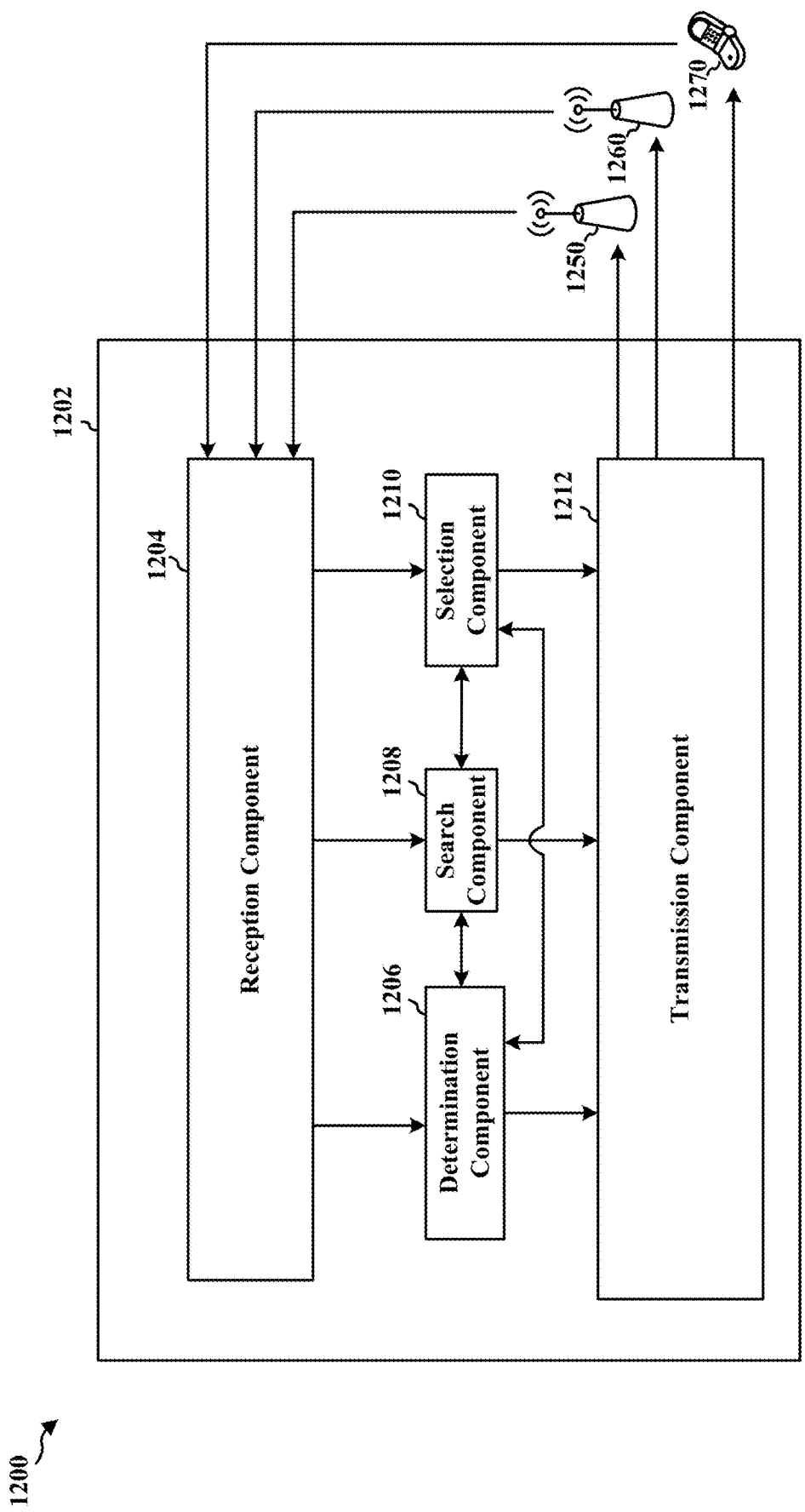
FIG. 11 is a conceptual data flow diagram illustrating the data flow between different means/components in an exemplary apparatus.

FIG. 11 is a conceptual data flow diagram 1200 illustrating the data flow between different means/components in an exemplary apparatus 1202. The apparatus may be a wireless device, such as one of the wireless devices 706a, 706b illustrated in FIG. 7. The apparatus includes a reception component 1204, a determination component 1206, a search component 1208, and a selection component 1210, and transmission component 1212.

Selection component 1210 selects a serving cell for connection to a network. For example, the selection component 1210 may select a serving cell for connection to a network, and communicate with serving base station 1250 using the network.

Search component 1208 performs a search for a frequency band on a neighbor cell for use in device-to-device communications. For example, search component 1208 may perform a search for a frequency band on a neighbor cell for use in performing device-to-device communications. For example, the frequency band may be the D2D frequency band described with reference to FIGS. 5 and 6.

Transmission component 1212 performs the device-to-device communications using pre-configured resources associated with the frequency band when the search component 1208 fails to detect the frequency band on the neighbor cell, and a signal is sent from the search component 1208 to the transmission component 1212. For example, if the D2D frequency band is not detected on the neighbor cell, the transmission component 1212 may perform the device-to-device communications with wireless device 1270 using pre-configured resources associated with the frequency band, as illustrated with respect to "MODEL A" in FIG. 7.

Alternatively, transmission component 1212 performs the device-to-device communications using resources associated with the frequency band of the neighbor cell when the search component 1208 detects for the frequency band on the neighbor cell, and a signal is sent from the search component 1208 to the transmission component 1212.

Determination component 1206 determines the resources associated with the frequency band of the neighbor cell using a SIB received from the neighbor cell base station 1260. For example, the reception component 1204 may receive the SIB19 in an overhead message from the neighbor cell base station 1260.

Transmission component 1212 may perform device-to-device transmissions using the frequency band of the neighbor cell or the serving cell.

Reception component 1204 may perform device-to-device receptions using the frequency band of the neighbor cell or the serving cell.

Determination component 1206 determines that the search for the frequency band on the neighbor cell has failed when a network connection is not detected after a predetermined number of searches.

Determination component 1206 may determine if a network connection was previously established with the neighbor cell if the search for the frequency band on the neighbor cell fails. For example, determination component 1206 may take into account cell sites including Wi-Fi, basic service set identification (BSSID) or cellular sites (e.g. CDMA, Evolution Data Optimized (EVDO), GSM, UMTS, TDSCDMA, or LTE).

Transmission component 1212 may perform the device-to-device communications using the pre-configured resources associated with the frequency band when the search for the frequency band on the neighbor cell fails when the determination component 1206 determines that that a confidence metric has been met, and a signal is sent from the determination component 1206 to the transmission component 1212. For example, the confidence level metric can be determined by the determination component 1206 based on 1) past determinations (e.g., N times out of K searches in the currently camped serving cell resulted in detection of a neighbor cell in the pre-configured band/eutra absolute radio frequency channel number) or a filtered value (e.g., infinite impulse response filter value) of such determinations exceeding a threshold, 2) signal strength from various cell sites when a neighbor cell was detected, and/or 3) the size of the serving cell on which the apparatus 1202 is camped. In an aspect, determination component 1206 may take into account cell sites including Wi-Fi, basic service set identification (BSSID) or cellular sites (e.g. CDMA, EVDO, GSM, UMTS, TDSCDMA, or LTE).

Determination component 1206 may determine that the device-to-device communications are not allowed on the frequency band. In this scenario, the search component 1208 may stop the search in order to conserve battery power.

The apparatus may include additional components that perform each of the blocks of the algorithm in the aforementioned flowcharts of FIGS. 10A-10C. As such, each block in the aforementioned flowcharts of FIGS. 10A-10C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
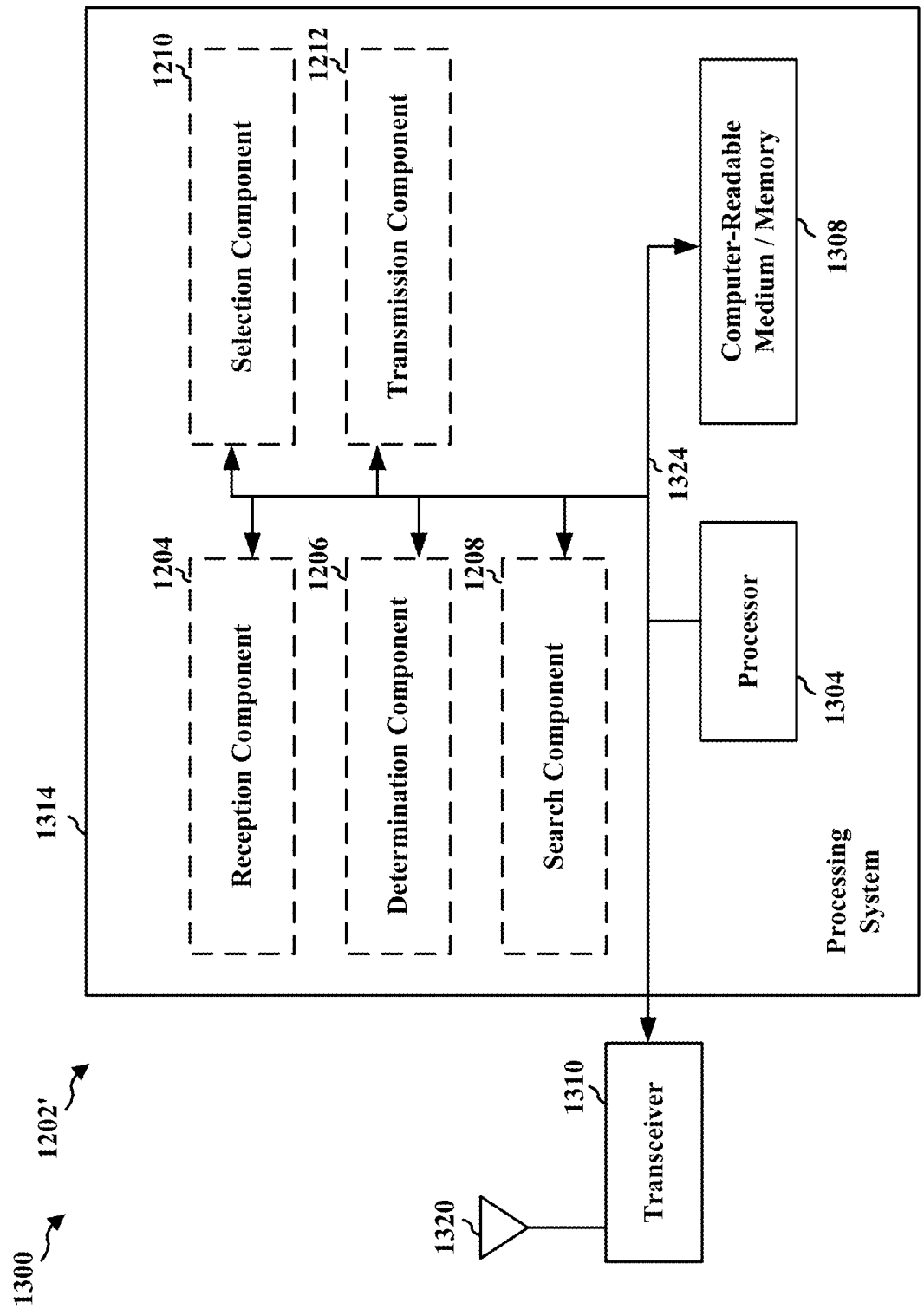
FIG. 12 is a diagram illustrating an example of a hardware implementation for an apparatus employing a processing system

FIG. 12 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for establishing a wireless connection to a first network. In another aspect, the apparatus 1202/1202' for wireless communication includes means for selecting a serving cell for connection to a network. In a further aspect, the apparatus 1202/1202' for wireless communication includes means for performing a search for a frequency band on a neighbor cell for use in device-to-device communications. Still in another aspect, the apparatus 1202/1202' for wireless communication includes means for performing the device-to-device communications using pre-configured resources associated with the frequency band when the search for the frequency band on the neighbor cell fails. In still another aspect, the apparatus 1202/1202' for wireless communication includes means for performing the device-to-device communications using resources associated with the frequency band of the neighbor cell when the search for the frequency band on the neighbor cell is successful. In a further aspect, the device-to-device communications are performed by the means for performing using a pre-configured offset timing when the search for the frequency band on the neighbor cell fails. In yet another aspect, the apparatus 1202/1202' for wireless communication includes means for determining the resources associated with the frequency band of the neighbor cell using a system information block received from the neighbor cell, wherein the system information block is received in an overhead message from the neighbor cell. Furthermore, the apparatus 1202/1202' for wireless communication includes means for decoding the SIB to determine if system information has changed. Additionally, the apparatus 1202/1202' for wireless communication includes means for decoding at least one additional SIB when it is determined that the system information has changed. In another aspect, the apparatus 1202/1202' for wireless communication includes means for performing device-to-device transmissions using the frequency band of the neighbor cell. Further, the apparatus 1202/1202' for wireless communication includes means for performing device-to-device receptions using the frequency band of the neighbor cell. Furthermore, the apparatus 1202/1202' for wireless communication includes means for performing device-to-device transmissions using a frequency band of the serving cell. Moreover, the apparatus 1202/1202' for wireless communication includes means for performing device-to-device receptions using the frequency band of the neighbor cell. Additionally, the apparatus 1202/1202' for wireless communication includes means for determining that the search for the frequency band on the neighbor cell has failed when a network connection is not detected after a predetermined number of searches. In an additional aspect, the apparatus 1202/1202' for wireless communication includes means for determining that the search for the frequency band on the neighbor cell is successful when a network connection is detected within a predetermined number of searches. In yet a further aspect, the apparatus 1202/1202' for wireless communication includes means for determining if a network connection was previously established with the neighbor cell if the search for the frequency band on the neighbor cell fails. In addition, the apparatus 1202/1202' for wireless communication includes means for performing the device-to-device communications using the pre-configured resources associated with the frequency band when the search for the frequency band on the neighbor cell fails based on a confidence metric. In one aspect, the means for performing the device-to-device communications uses pre-configured resources associated with the frequency band by selecting a frequency from a list of frequencies based on a pre-configured priority or based on a previous frequency used in the device-to-device communications. Additionally, the means for performing the device-to-device communications uses resources associated with the frequency band of the neighbor cell by selecting a neighbor frequency based on priority information received in a system information block from the neighbor cell. Further still, the apparatus 1202/1202' for wireless communication includes means for determining that the device-to-device communications are not allowed on the frequency band. In another aspect, the apparatus 1202/1202' for wireless communication includes means for stopping the search when the device-to-device communications are not allowed on the frequency band.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   selecting a serving cell for connection to a network;
   performing a search for a frequency band on a neighbor cell for use in device-to-device communications;
   determining the resources associated with the frequency band of the neighbor cell using a system information block (SIB) received from the neighbor cell, wherein the SIB is received in an overhead message from the neighbor cell;
   decoding the SIB to determine if system information has changed;
   decoding at least one additional SIB when it is determined that the system information has changed;
   performing the device-to-device communications using pre-configured resources associated with the frequency band and a pre-configured offset timing when the search for the frequency band on the neighbor cell fails, wherein the pre-configured offset timing is used to discover resources associated with the frequency band; and
   performing the device-to-device communications using the resources associated with the frequency band of the neighbor cell when the search for the frequency band on the neighbor cell is successful.

2. The method of claim 1, further comprising:
   performing device-to-device transmissions using the frequency band of the neighbor cell; and
   performing device-to-device receptions using the frequency band of the neighbor cell.

3. The method of claim 1, further comprising:
   performing device-to-device transmissions using a frequency band of the serving cell; and
   performing device-to-device receptions using the frequency band of the neighbor cell.

4. The method of claim 1, further comprising:
   determining that the search for the frequency band on the neighbor cell has failed when a network connection is not detected after a predetermined number of searches.

5. The method of claim 1, further comprising:
   determining that the search for the frequency band on the neighbor cell is successful when a network connection is detected within one or more predetermined number of searches.

6. The method of claim 1, further comprising:
   determining if a network connection was previously established with the neighbor cell if the search for the frequency band on the neighbor cell fails; and
   performing the device-to-device communications using the pre-configured resources associated with the frequency band when the search for the frequency band on the neighbor cell fails based on a confidence metric.

7. The method of claim 1, wherein:
   the performing the device-to-device communications using pre-configured resources associated with the frequency band comprises selecting a frequency from a list of frequencies based on a pre-configured priority or based on a previous frequency used in the device-to-device communications; and
   the performing the device-to-device communications using resources associated with the frequency band of the neighbor cell comprises selecting a neighbor frequency based on priority information received in a system information block from the neighbor cell.

8. The method of claim 1, further comprising:
determining that the device-to-device communications are not allowed on the frequency band; and
stopping the search when the device-to-device communications are not allowed on the frequency band.

9. An apparatus for wireless communication, comprising:
means for selecting a serving cell for connection to a network;
means for performing a search for a frequency band on a neighbor cell for use in device-to-device communications;
means for determining the resources associated with the frequency band of the neighbor cell using a system information block (SIB) received from the neighbor cell, wherein the SIB is received in an overhead message from the neighbor cell;
means for decoding the SIB to determine if system information has changed;
means for decoding at least one additional SIB when it is determined that the system information has changed;
means for performing the device-to-device communications using pre-configured resources associated with the frequency band and a pre-configured offset timing when the search for the frequency band on the neighbor cell fails, wherein the pre-configured offset timing is used to discover resources associated with the frequency band; and
means for performing the device-to-device communications using the resources associated with the frequency band of the neighbor cell when the search for the frequency band on the neighbor cell is successful.

10. The apparatus of claim 9, further comprising:
means for performing device-to-device transmissions using the frequency band of the neighbor cell; and
means for performing device-to-device receptions using the frequency band of the neighbor cell.

11. The apparatus of claim 9, further comprising:
means for performing device-to-device transmissions using a frequency band of the serving cell; and
means for performing device-to-device receptions using the frequency band of the neighbor cell.

12. The apparatus of claim 9, further comprising:
means for determining that the search for the frequency band on the neighbor cell has failed when a network connection is not detected after a predetermined number of searches.

13. The apparatus of claim 9, further comprising:
means for determining that the search for the frequency band on the neighbor cell is successful when a network connection is detected within one or more searches.

14. The apparatus of claim 9, further comprising:
means for determining if a network connection was previously established with the neighbor cell if the search for the frequency band on the neighbor cell fails; and
means for performing the device-to-device communications using the pre-configured resources associated with the frequency band when the search for the frequency band on the neighbor cell fails based on a confidence metric.

15. The apparatus of claim 9, wherein:
the means for performing the device-to-device communications uses pre-configured resources associated with the frequency band by selecting a frequency from a list of frequencies based on a pre-configured priority or based on a previous frequency used in the device-to-device communications; and
the means for performing the device-to-device communications uses resources associated with the frequency band of the neighbor cell by selecting a neighbor frequency based on priority information received in a system information block from the neighbor cell.

16. The apparatus of claim 9, further comprising:
means for determining that the device-to-device communications are not allowed on the frequency band; and
means for stopping the search when the device-to-device communications are not allowed on the frequency band.

17. An apparatus for wireless communication, comprising:
a memory; and
at least one processor coupled to the memory and configured to:
select a serving cell for connection to a network;
perform a search for a frequency band on a neighbor cell for use in device-to-device communications;
determine the resources associated with the frequency band of the neighbor cell using a system information block (SIB) received from the neighbor cell, wherein the SIB is received in an overhead message from the neighbor cell;
decode the SIB to determine if system information has changed;
decode at least one additional SIB when it is determined that the system information has changed;
perform the device-to-device communications using pre-configured resources associated with the frequency band and a pre-configured offset timing when the search for the frequency band on the neighbor cell fails, wherein the pre-configured offset timing is used to discover resources associated with the frequency band; and
perform the device-to-device communications using the resources associated with the frequency band of the neighbor cell when the search for the frequency band on the neighbor cell is successful.

18. The apparatus of claim 17, wherein the at least one processor is further configured to:
perform device-to-device transmissions using the frequency band of the neighbor cell; and
perform device-to-device receptions using the frequency band of the neighbor cell.

19. The apparatus of claim 17, wherein the at least one processor is further configured to:
perform device-to-device transmissions using a frequency band of the serving cell; and
perform device-to-device receptions using the frequency band of the neighbor cell.

20. The apparatus of claim 17, wherein the at least one processor is further configured to:
determine that the search for the frequency band on the neighbor cell has failed when a network connection is not detected after a predetermined number of searches.

21. The apparatus of claim 17, wherein the at least one processor is further configured to:
determine that the search for the frequency band on the neighbor cell is successful when a network connection is detected within one or more searches.

22. The apparatus of claim 17, wherein the at least one processor is further configured to:
determine if a network connection was previously established with the neighbor cell if the search for the frequency band on the neighbor cell fails; and perform the device-to-device communications using the pre-configured resources associated with the frequency band when the search for the frequency band on the neighbor cell fails based on a confidence metric.

23. The apparatus of claim 17, wherein the at least one processor is configured to:
perform the device-to-device communications using pre-configured resources associated with the frequency band by selecting a frequency from a list of frequencies based on a pre-configured priority or based on a previous frequency used in the device-to-device communications; and
perform the device-to-device communications using resources associated with the frequency band of the neighbor cell by selecting a neighbor frequency based on priority information received in a system information block from the neighbor cell.

24. A non-transitory computer-readable medium storing computer executable code for wireless communication, comprising code for:
selecting a serving cell for connection to a network;
performing a search for a frequency band on a neighbor cell for use in device-to-device communications;
determining the resources associated with the frequency band of the neighbor cell using a system information block (SIB) received from the neighbor cell, wherein the SIB is received in an overhead message from the neighbor cell;
decoding the SIB to determine if system information has changed;
decoding at least one additional SIB when it is determined that the system information has changed;
performing the device-to-device communications using pre-configured resources associated with the frequency band and a pre-configured offset timing when the search for the frequency band on the neighbor cell fails, wherein the pre-configured offset timing is used to discover resources associated with the frequency band; and
performing the device-to-device communications using the resources associated with the frequency band of the neighbor cell when the search for the frequency band on the neighbor cell is successful.

* * * * *